Patented Mar. 18, 1952

2,589,233

UNITED STATES PATENT OFFICE 2,589,233

METHOD OF PREPARING STABILIZED TALL OIL NITRILES

John Drew, De Ridder, La., and Joe C. Funderburk, Hattiesburg, Miss., assignors to Hercules Powder Company, Wilmington, Del., a corporation of Delaware No Drawing. Application March 14, 1950, Serial No. 149,656

6 Claims. (Cl. 260—97.5)

This invention relates to an improved process for the preparation of tall oil nitriles by the reaction between tall oil and ammonia.

Tall oil nitriles have been prepared heretofore by contacting tall oil with ammonia in liquid or vapor phase in the presence or absence of catalysts. One of the greatest difficulties in all of these processes is the tendency for the tall oil to break down and to polymerize under the reaction conditions resulting in a reduced yield of nitrile. Specialized equipment has been developed to overcome these difficulties as exemplified by U. S. 2,380,531 to Jolly, who strives for as short a reaction period as possible at elevated temperature. Moreover, catalysts which have been employed heretofore have been inorganic catalysts insoluble in the reagents used. Such catalysts have involved a heterogeneous system requiring means for continuously contacting the catalyst with the reagents. Special equipment and apparatus have thus been required and equipment investment costs have accordingly increased with improvements in the processes. A simplified process involving only simple equipment has obvious advantages for the small chemical manufacturer.

Now in accordance with this invention, it has been found that tall oil nitrile may be prepared by heating tall oil in the liquid phase with gaseous ammonia in the presence of a catalytic amount of a salt of the tall oil acids involved in the reaction and a metal of group II of the periodic table.

The process of this invention is carried out by heating the tall oil in which is dissolved a catalytic amount of the carboxylic acid salt of a metal of group II of the periodic table at a temperature within the range of about 250 to about 350° C. while passing ammonia gas through the mixture and removing the water formed.

As an example of this invention, tall oil acids are heated and a small amount of zinc oxide is added with agitation at about 250° C. until the zinc oxide is completely reacted to form a solution of zinc salts of the tall oil carboxylic acids in the tall oil. This mixture is then heated in a closed vessel having means for introducing ammonia gas in the lower part of the vessel and having an outlet for gases such as water vapor and ammonia. Ammonia gas is introduced into the mixture at a rate such that the theoretical amount of ammonia is added per hour. The unreacted ammonia containing water vapor is withdrawn, dried by passing through cooling condensers, and is recirculated until the acid number of the charge is reduced to a negligible value close to zero. The tall oil nitrile is then separated from unreacted acids and zinc salts by distillation. The zinc salts comprising the residue are then re-used, as a source of catalyst, by dissolving them in a subsequent charge of tall oil, if desired.

In Table 1 are given typical data on the preparations of the tall oil nitrile from commercial tall oil using a reaction temperature in the range of 325±5° C. A blank in which no catalyst is used is given for comparison. These data show the improvement in terms of shortened reaction time for the production of a crude undistilled tall oil nitrile having a nitrogen content 3.6 to 4%, and also in terms of improved yield of distillable nitrile. The productivities attained in these runs varied within experimental error from about 0.61 to about 0.68. In these examples the metal salt was produced in situ from the oxide in all cases with the exception of Example IV in which the catalyst was added as strontium abietate.

Table 1

| Example | Blank | I | II | III | IV |
|---|---|---|---|---|---|
| Commercial Tall Oil Weight | 1,500 | 1,500 | 1,500 | 1,500 | 1,500 |
| Metal Salt of Tall Oil Acids | None | Zn | Zn | Mg | Sr |
| Weight (Calculated as Stearate.) | | 19.5 | 39.0 | 36.8 | 14.3 |
| Time (hr.) Required to Reach 3.6–4.0% Nitrogen Content | 7 | 3.5 | 3.5 | 4.0 | 5.7 |
| Per Cent Distillable Product | 65.2 | 81.1 | 80.0 | 77.8 | 77.2 |

By the use of catalysts of this invention not only is the time of reaction greatly shortened but the yield of distillable product is also greatly increased. The tall oil nitrile is the major component of the distillable portion of the product.

The catalysts of the invention may be prepared in any well-known manner such as by the precipitation method, in which case the precipitated metal salt is added to the tall oil prior to treatment with ammonia. However, the salts are preferably, for reasons of convenience, prepared in situ by adding the oxide, hydroxide, or lower volatile fatty acid salt of the metal to the melted tall oil and allowing reaction to take place at temperatures up to about 300° C. with volatilization of water or lower volatile fatty acid, if present, and resultant formation of a homogeneous solution of the carboxylic acid salt prior to addition of the ammonia. The salt may likewise be formed in situ by reaction between an inorganic salt of the metal and the ammonium salt of the tall oil. For example, the reaction of ammonium stearate and zinc chloride will form zinc stearate and ammonium chloride with no objectionable side reactions at temperatures below 100° C. ammonium chloride quickly sublimes at 250–350° C. during the ammoniation period. Traces of water which may aid the reaction result from the formation of traces of nitrile.

The amount of catalyst of this invention which is used should be in the catalytic range, i. e., sufficient should be used to accelerate the reaction. The amount may, for example, be within the range of about 0.1% and 15.0% based upon the amount of tall oil used. The preferred amount of catalyst is within the range of about 0.1% and about 5% based on the weight of tall oil used.

The catalysts of the present invention are completely soluble in the tall oil in the catalytic amounts used at the temperature of reaction. The metal salts thus form a homogeneous system with the tall oil at reaction temperature and as a result side reactions are at a minimum. The metal salts in this respect differ from the alumina and silica gel catalysts of the prior art which were insoluble in the tall oil and formed a heterogeneous mixture of tall oil and catalyst which was treated with the ammonia.

Although the reaction of the tall oil with ammonia may be carried out at a temperature of about 250° C. to about 350° C., it is preferably carried out at about 300° C. to about 330° C.

Any means of contacting the tall oil in liquid phase with ammonia may be used. The use of a sparge tube for introduction of ammonia usually provides for sufficient contact between the ammonia and tall oil. Since the catalyst is in solution, agitation to promote catalyst dispersions is unnecessary. The amount of ammonia used in the reaction depends upon the efficiency of the ammonia-tall oil contact. In any event it should be at least the quantity necessary to react completely with the carboxylic acids present. In the above examples, the ammonia sparge rate was adjusted so that roughly every hour sufficient ammonia had passed into the reaction mixture to completely react with the acids present. The reaction may be carried out under pressure or under a slight vacuum. However, it is preferably carried out at atmospheric pressure because of simplified equipment.

Ammonia is passed into the tall oil in liquid phase until the reaction is essentially complete. Usually, it is convenient to add ammonia until the acid number of the reaction mixture is below 5. However, the reaction may be carried out until the amount of unreacted acid is negligible.

The reaction mixture may be distilled in vacuo to give an acid-free product. The reaction mixture may be distilled without neutralization, but in this case, if an acid-free product is desired, it is necessary to carry out the distillation with very careful fractionation.

The tall oil nitriles prepared in accordance with this invention may be used as insecticides, rubber softeners, oil additives, plasticizers, etc. They are particularly valuable as chemical intermediates for the preparation of amines, amides, amidines, etc.

What we claim and desire to protect by Letters Patent is:

1. The process of preparing tall oil nitrile which comprises reacting tall oil in liquid phase with gaseous ammonia in the presence of a metal salt of tall oil carboxylic acids wherein said metal is a metal of group II of the periodic table.

2. The process of preparing tall oil nitrile which comprises reacting tall oil in liquid phase at a temperature of about 250° C. to about 350° C. with gaseous ammonia in the presence of a metal salt of tall oil carboxylic acids wherein said metal is a metal of group II of the periodic table.

3. The process of preparing tall oil nitrile which comprises reacting tall oil in liquid phase at a temperature of about 300° C. to about 330° C. with gaseous ammonia in the presence of a metal salt of tall oil carboxylic acids wherein said metal is a metal of group II of the periodic table.

4. The process of preparing tall oil nitrile which comprises reacting tall oil in liquid phase at a temperature of about 300° C. to about 330° C. with gaseous ammonia in the presence of a zinc salt of tall oil carboxylic acids.

5. The process of preparing tall oil nitrile which comprises reacting tall oil in liquid phase at a temperature of about 300° C. to about 330° C. with gaseous ammonia in the presence of a magnesium salt of tall oil carboxylic acids.

6. The process of preparing tall oil nitrile which comprises reacting tall oil in liquid phase at a temperature of about 300° C. to about 330° C. with gaseous ammonia in the presence of a strontium salt of tall oil carboxylic acids.

JOHN DREW.
JOE C. FUNDERBURK.

REFERENCES CITED

The following references are of record in the file of this patent:

UNITED STATES PATENTS

| Number | Name | Date |
|---|---|---|
| 2,375,005 | Kung | May 1, 1945 |
| 2,461,349 | Ralston | Feb. 8, 1949 |
| 2,490,271 | Jolly | Dec. 6, 1949 |
| 2,493,637 | Niederhauser | Jan. 3, 1950 |